United States Patent
Amling et al.

(10) Patent No.: US 12,516,732 B2
(45) Date of Patent: Jan. 6, 2026

(54) FACE SEAL COUPLING ASSEMBLY

(71) Applicant: Parker-Hannifin Corporation, Cleveland, OH (US)

(72) Inventors: Theodore T. Amling, Columbus, OH (US); Nathan Green, Galloway, OH (US); Andreas Udhoefer, Gütersloh (DE)

(73) Assignee: Parker-Hannifin Corporation, Cleveland, OH (US)

( * ) Notice: Subject to any disclaimer, the term of this patent is extended or adjusted under 35 U.S.C. 154(b) by 132 days.

(21) Appl. No.: 18/548,595

(22) PCT Filed: Jun. 9, 2022

(86) PCT No.: PCT/US2022/032765
§ 371 (c)(1),
(2) Date: Sep. 1, 2023

(87) PCT Pub. No.: WO2022/261273
PCT Pub. Date: Dec. 15, 2022

(65) Prior Publication Data
US 2024/0068567 A1 Feb. 29, 2024

Related U.S. Application Data

(60) Provisional application No. 63/209,485, filed on Jun. 11, 2021.

(51) Int. Cl.
*F16J 15/08* (2006.01)
(52) U.S. Cl.
CPC ..................... *F16J 15/08* (2013.01)
(58) Field of Classification Search
CPC .... F16L 19/0218; F16L 19/02; F16J 15/0818; F16J 15/08
See application file for complete search history.

(56) References Cited

U.S. PATENT DOCUMENTS 2,926,937 A * 3/1960 Parsons ................. F16L 15/008
277/650
3,080,171 A * 3/1963 Booth .................. F16J 15/0887
277/622

(Continued)

FOREIGN PATENT DOCUMENTS

CN 203463645 U 3/2014
DE 102011017612 B4 11/2012

OTHER PUBLICATIONS

International Search Report and Written Opinion of the International Searching Authority for corresponding International Patent Application No. PCT/US2022/032765, mailed Sep. 27, 2022.

*Primary Examiner* — Eugene G Byrd
(74) *Attorney, Agent, or Firm* — Renner, Otto, Boisselle & Sklar, LLP

(57) ABSTRACT

A metal seal for a flat face fluid coupling includes an annular seal body and a retainer having a fixed end fixed to the seal body, a free end spaced from the seal body, and an intermediate portion extending between the free end and the fixed end. The retainer is configured to engage a wall of the fluid coupling with a retaining force for securing the seal to the fluid coupling. The seal body has opposite first and second flat annular sealing surfaces, and a radially outer annular angled portion that is inclined relative to the annular sealing surface. The angled portion is configured to enhance stiffness around a circumference of the seal body, and is configured to engage a face of the fluid coupling to generate a moment of force about the retainer for enhancing the retaining force acting against the wall of the fluid coupling.

19 Claims, 10 Drawing Sheets

(56) References Cited

U.S. PATENT DOCUMENTS

| | | | | |
|---|---|---|---|---|
| 3,262,722 | A * | 7/1966 | Gastineau | F16L 41/10 285/379 |
| 3,275,348 | A * | 9/1966 | Scott | F16L 41/10 285/212 |
| 3,394,915 | A * | 7/1968 | Gachot | F16K 27/067 251/315.04 |
| 4,277,047 | A | 7/1981 | Zinnai | |
| 4,504,066 | A * | 3/1985 | Horl | B62D 55/0887 277/390 |
| 4,540,205 | A * | 9/1985 | Watanabe | F16L 19/0212 285/329 |
| 4,570,981 | A * | 2/1986 | Fournier | F16L 19/0218 285/354 |
| 4,582,080 | A * | 4/1986 | Stock | F16K 1/2266 251/173 |
| 4,838,583 | A * | 6/1989 | Babuder | F16L 19/0212 285/379 |
| 5,078,412 | A * | 1/1992 | Baumgarth | F16J 15/3284 277/921 |
| 5,145,219 | A * | 9/1992 | Babuder | F16L 19/0212 285/379 |
| 5,163,721 | A * | 11/1992 | Babuder | F16L 19/0212 285/379 |
| 5,340,170 | A * | 8/1994 | Shinohara | F16L 27/0832 285/379 |
| 5,366,261 | A * | 11/1994 | Ohmi | F16L 19/0212 285/379 |
| 5,409,270 | A * | 4/1995 | Shinohara | F16L 19/0212 285/379 |
| 5,423,580 | A * | 6/1995 | Mohlenkamp | F16L 19/0218 285/379 |
| 5,490,680 | A | 2/1996 | Patel et al. | |
| 5,564,177 | A | 10/1996 | Fernandes et al. | |
| 5,865,422 | A * | 2/1999 | Barker | F16K 1/2266 251/173 |
| 6,170,890 | B1 * | 1/2001 | Ohmi | F16L 19/025 285/379 |
| 6,923,792 | B2 * | 8/2005 | Staid | F16L 19/0218 604/249 |
| 7,364,166 | B2 | 4/2008 | Yoakam et al. | |
| 7,478,816 | B2 | 1/2009 | Olberding et al. | |
| 7,717,434 | B2 * | 5/2010 | Blessing | F16J 15/0887 277/609 |
| 9,453,600 | B2 | 9/2016 | Bailey et al. | |
| 9,879,779 | B2 * | 1/2018 | Guidi | F16J 15/061 |
| 2004/0145124 | A1 * | 7/2004 | Yoakam | F16L 19/0218 277/609 |
| 2008/0272550 | A1 | 11/2008 | Topping | |
| 2013/0313824 | A1 * | 11/2013 | Bailey | F16L 19/0218 285/379 |
| 2014/0110937 | A1 * | 4/2014 | Okabe | F16L 19/025 285/354 |
| 2022/0221057 | A1 * | 7/2022 | Mckay | F16J 15/061 |

\* cited by examiner

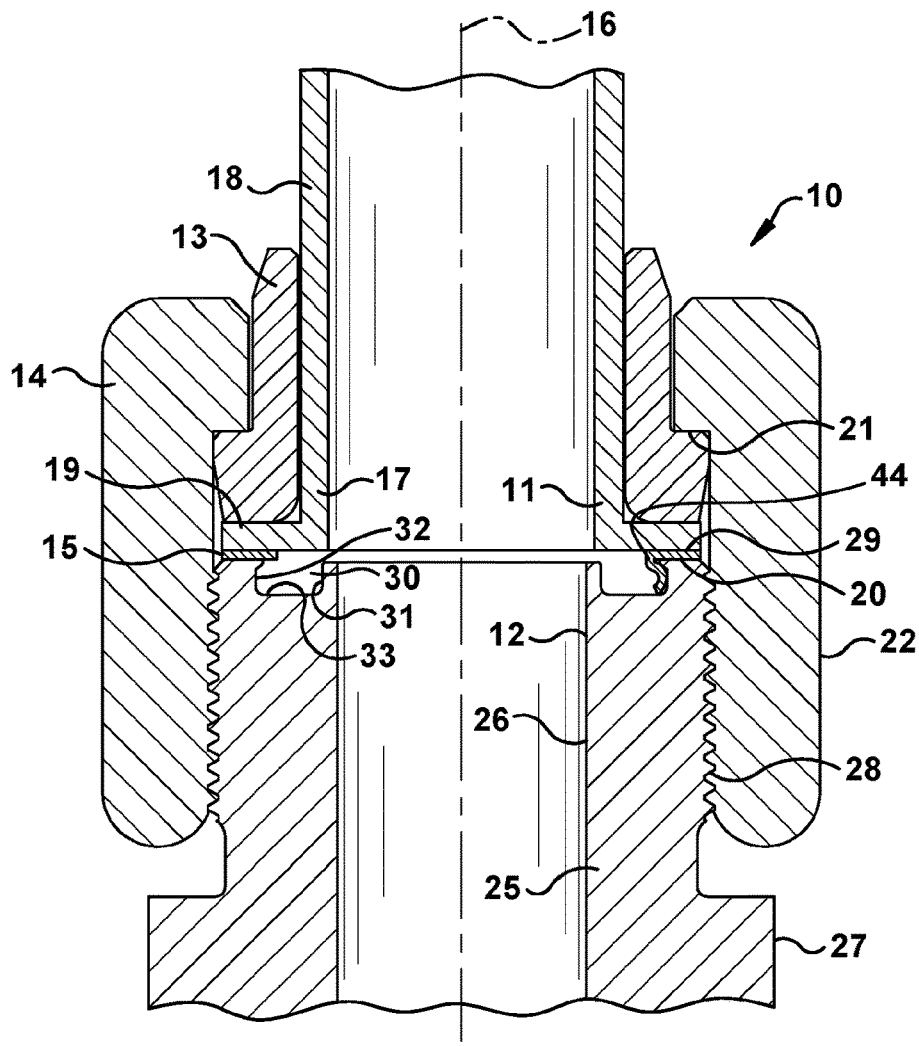
Fig. 1
(Conventional)
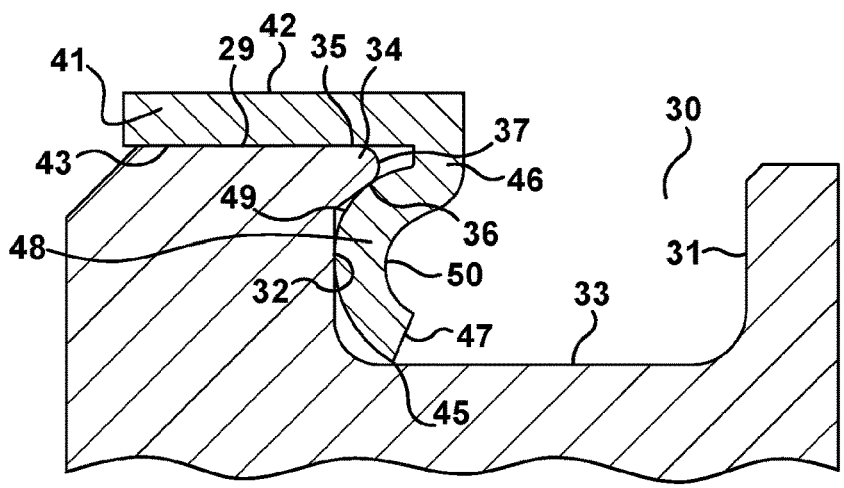
Fig. 2
(Conventional)

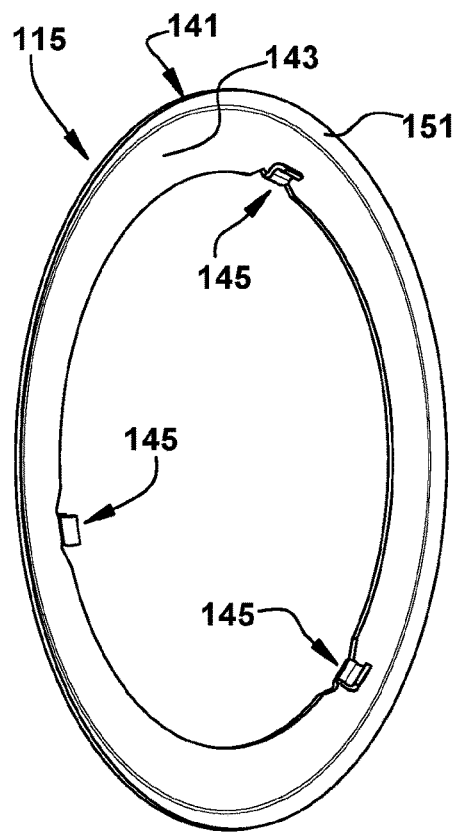
Fig. 6
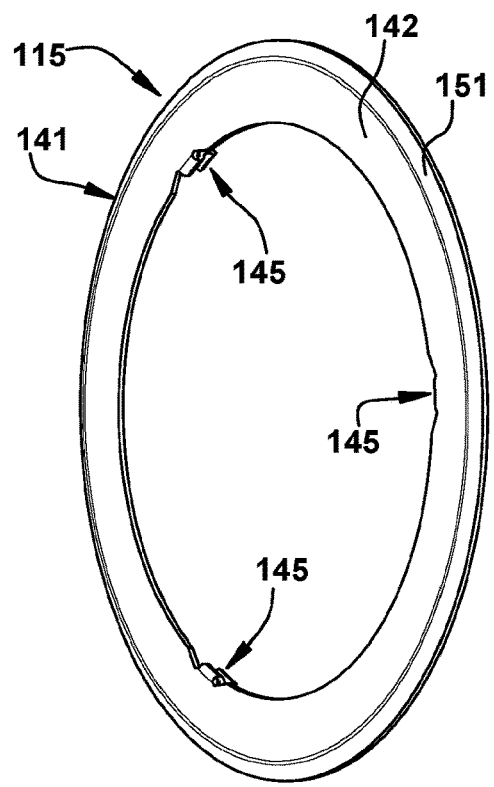
Fig. 7
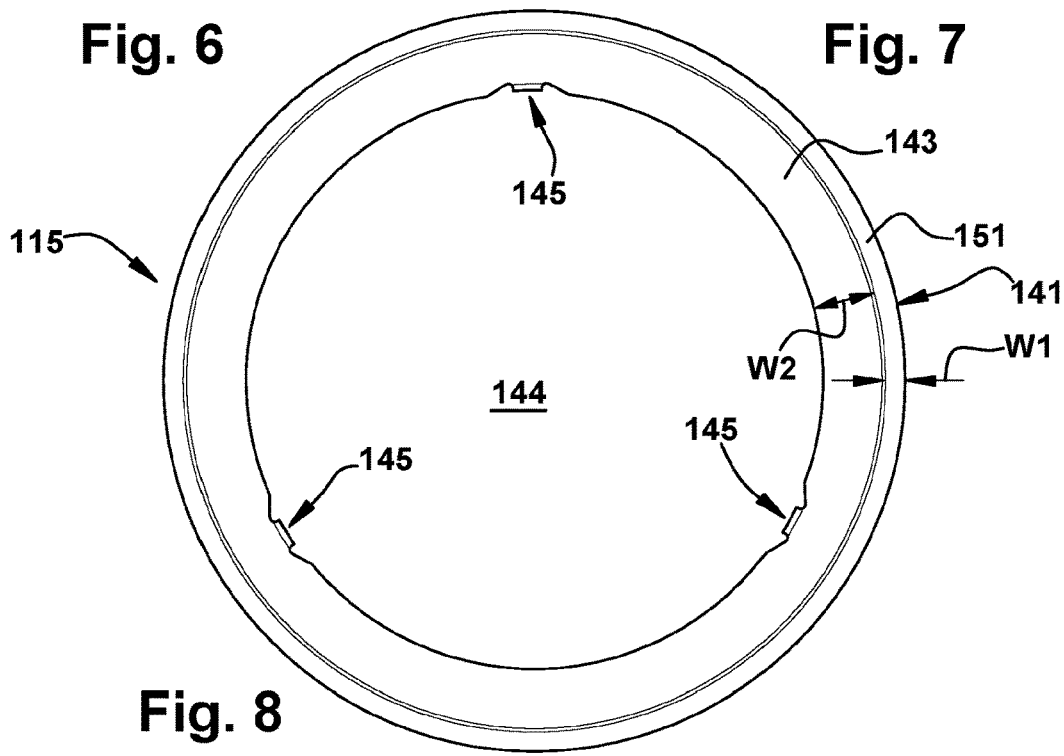
Fig. 8

FACE SEAL COUPLING ASSEMBLY

RELATED APPLICATIONS

This application is a national phase of International Application No. PCT/US2022/032765 filed Jun. 9, 2022, which claims the benefit of U.S. Provisional Application No. 63/209,485 filed Jun. 11, 2021, which is hereby incorporated herein by reference in its entirety.

TECHNICAL FIELD

The present invention relates generally to face seals for fluid coupling assemblies, and more particularly to a metal face seal coupling assembly for extreme service applications.

BACKGROUND

Face seals for fluid coupling assemblies are commonly used to sealingly connect together components in a fluid system. A face seal coupling assembly generally is one in which a sealing surface of one of the coupling members has a generally flat face disposed in a plane that is generally perpendicular to the central or longitudinal axis of the coupling member, and a seal carried by the other coupling member sealingly engages against the flat face of the first coupling member. In this type of fluid coupling assembly, the seal may be a conventional elastomeric O-ring seal that is retained in a groove in the second coupling member and provides a fluid seal when the coupling members are connected together. Such elastomeric O-ring seals may be selected in a known manner, examples of which are disclosed in U.S. Pat. Nos. 5,490,680 and 5,564,177.

One common issue with elastomeric O-ring seals is that they are unsuitable for use in some severe service applications, such as high-temperature applications or conditions in which the elastomer lacks chemical compatibility with the external environment and/or internal fluid chemistry. As such, face seals made of metal are commonly used in such severe service applications. Some metal seals may include retaining features to better secure the metal seal against the coupling member. An example of such a metal face seal with retaining members is described in U.S. Pat. No. 9,453,600, which is incorporated herein by reference.

SUMMARY

Although metal face seals of the type described above are suitable for use in many severe service applications, such metal seals may lack stiffness and may distort prior to assembly on the face coupling assembly. As such, the installer may have issues securing the metal face seal onto the coupling member and obtaining a suitable seal. The lack of stiffness and distortion of the metal seal also may render retaining features inadequate to secure the seal to the coupling member during the installation procedure. This issue is particularly problematic for larger diameter coupling designs. Although stiffer materials or thicker gauge material stock may address some of these concerns, such material selection is not practical for many applications.

At least one aspect according to the present disclosure provides a metal seal for a face seal coupling assembly that solves one or more problems of conventional metal face seal designs.

For example, according to at least one aspect, a metal seal for a face seal coupling assembly provides an angled outer annular portion that is designed to enhance stiffness of the seal body and improve the retaining force provided by one or more retaining members of the seal. The exemplary seal according to the present disclosure also may include unique retaining members that improve over conventional designs.

According to an aspect, a [metal seal for a flat face fluid coupling, includes: an annular seal body defining a central axis and a central passage extending axially through the seal body along the central axis; and at least one seal retainer, the at least one seal retainer having a fixed end fixed to a radially inner portion of the seal body, a free end spaced from the seal body, and an intermediate portion extending between the free end and the fixed end, the at least one seal retainer being configured to engage a retainer wall of the fluid coupling with a retaining force for securing the seal to the fluid coupling; wherein the annular seal body has opposite axially facing first and second flat annular sealing surfaces, and a radially outer annular angled portion that is inclined relative to the first flat annular sealing surface, the annular angled portion being configured to enhance stiffness around a circumference of the annular seal body, and the annular angled portion being configured to engage a face of the fluid coupling to generate a moment of force about a portion of the at least one seal retainer for enhancing the retaining force of the at least one seal retainer acting against the retainer wall of the fluid coupling.

According to another aspect, a fluid coupling assembly includes: a first face seal fluid coupling having a first flat sealing surface at a first end, a first fluid passage extending through the first end radially inwardly of the first flat sealing surface, and a threaded nut rotatable about the first end; a second face seal fluid coupling having: threads for threadedly engaging the threaded nut of the first fluid fitting; a second flat sealing surface at a second end of the second fluid coupling that faces toward the first flat sealing surface of the first fluid coupling, an annular face groove extending axially into the second end and axially away from the second flat sealing surface of the second fluid coupling, and a second fluid passage extending through the second end radially inwardly of the second flat sealing surface and the annular face groove; and a metal seal arranged between the first flat sealing surface and the second flat sealing surface, the metal seal comprising: an annular seal body defining a central axis and a central passage extending axially through the seal body along the central axis, the central passage being aligned with the first and second fluid passages of the fluid couplings; and retainers circumferentially spaced apart from each other about a radially inner portion of the annular seal body, each retainer having a fixed end fixed to the radially inner portion, a free end spaced from the seal body, and an intermediate portion extending between the free end and the fixed end, the retainers being configured to engage a surface of the annular face groove of the second fluid coupling; wherein the annular seal body has opposite axially facing first and second flat annular sealing surfaces in which the first annular sealing surface engages the first flat sealing surface of the first fluid coupling and the second annular sealing surface engages the second flat sealing surface of the second fluid coupling, and the annular seal body having an annular angled portion that is radially outward of the first and second flat annular sealing surfaces and is inclined relative to the first flat annular sealing surface in a direction radially outwardly and toward the second fluid coupling, the annular angled portion being configured to enhance stiffness around a circumference of the annular seal body, and being configured to engage a surface of the second fluid coupling to generate a moment of force that enhances retaining force of the retainers acting against the surface of the annular groove of the second fluid coupling.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

FIG. 1 is a cross-sectional side view of a conventional flat face seal fitting assembly.

FIG. 2 is an enlarged cross-sectional side view of a portion of the fitting assembly shown in FIG. 1.

FIG. 5 is a side elevation view of the metal seal in FIG. 3.

FIG. 6 is a bottom perspective view of the metal seal in FIG. 3.

FIG. 7 is a top perspective view of the metal seal in FIG. 3.

FIG. 8 is a bottom plan view of the metal seal in FIG. 3.

DETAILED DESCRIPTION

Figure 3:
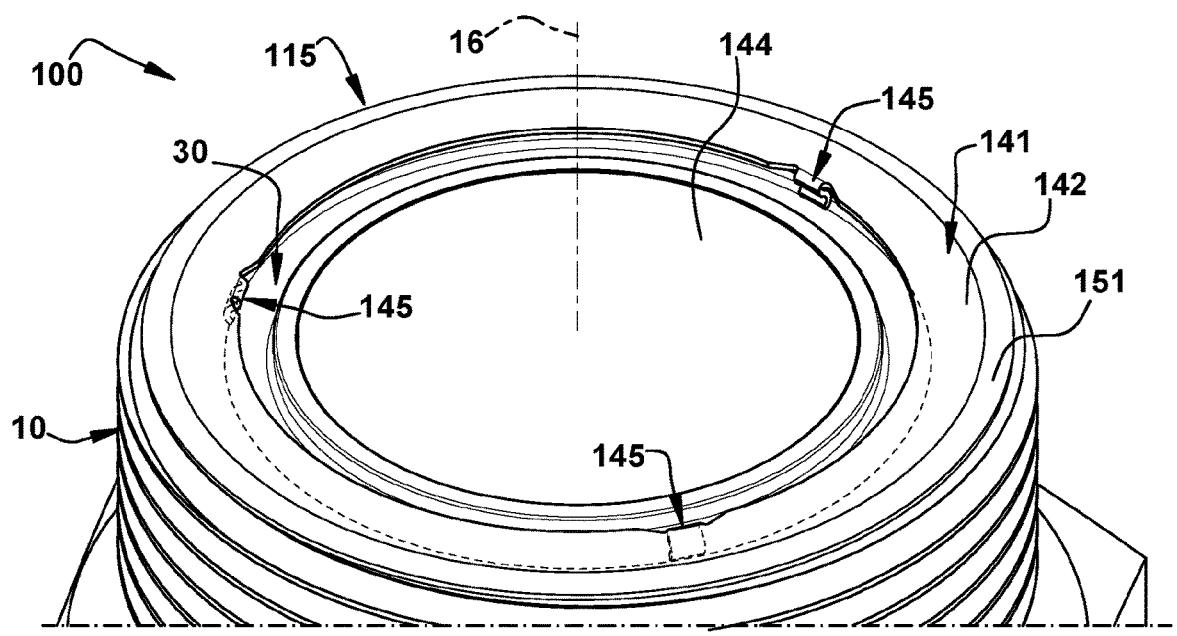
FIG. 3 is a perspective view of an exemplary metal seal according to an embodiment of the present disclosure installed on a fluid coupling.
Figure 4:
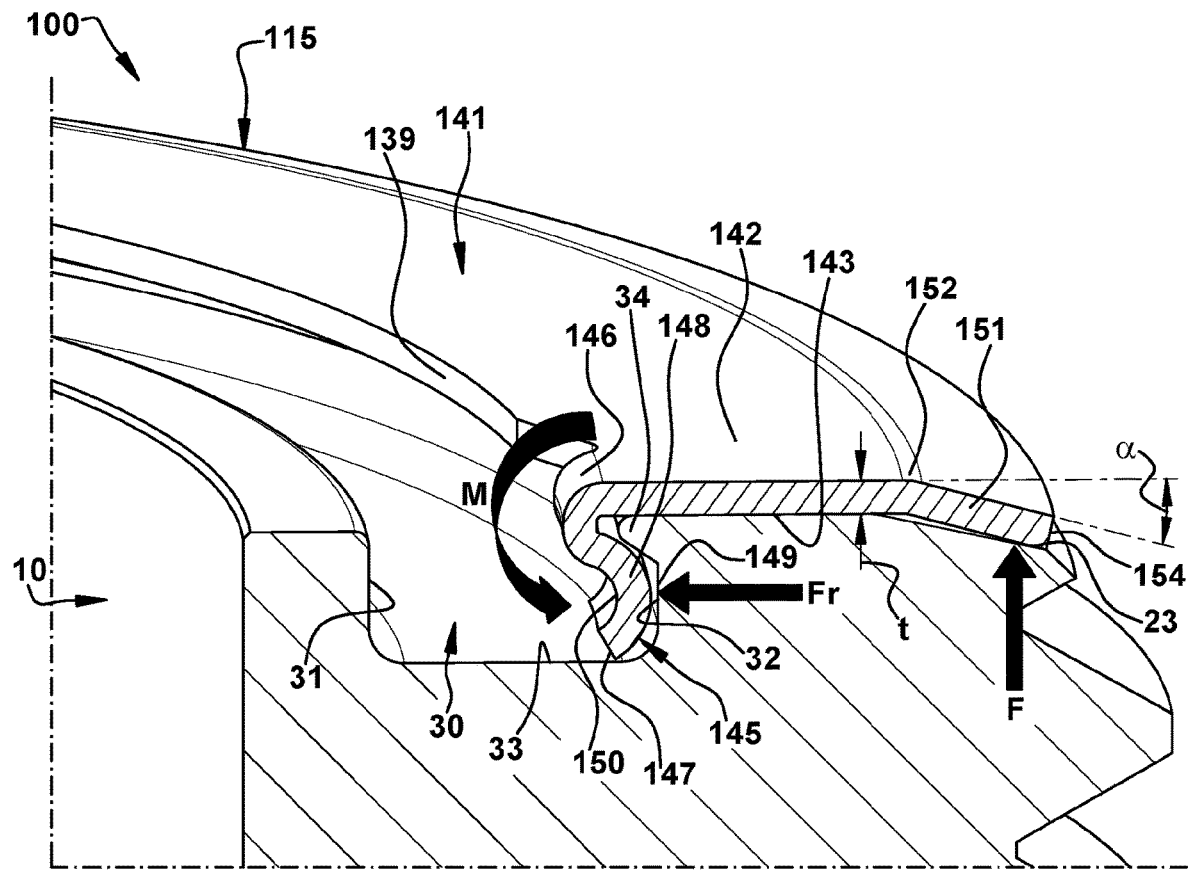
FIG. 4 is an enlarged cross-sectional perspective view of a portion of the metal seal and coupling in FIG. 3.

Referring initially to FIGS. 1 and 2, a conventional face seal fitting assembly according to U.S. Pat. No. 9,453,600 is shown, including a face seal fluid fitting 10 and a metal seal 15 that is capable of operating in extreme conditions. As shown, the conventional face seal fluid fitting 10 includes a first flat face seal fitting member 11, a second flat face seal fitting member 12, a sleeve 13, a nut 14, and the metal seal 15, which are all arranged in coaxial alignment along a longitudinal axis 16. The first fitting member 11, second fitting member 12, sleeve 13, and nut 14 may each be generally cylindrical. An example of such fitting components may be of the type generally described in U.S. Pat. Nos. 5,490,680 and 5,564,177, the disclosures of which are incorporated herein by reference. These fitting components may be stainless steel or other suitable material.

The first flat face seal fitting member 11 may be of any desired configuration, and in the illustrated embodiment is integrally formed on the free end 17 of a metal tube 18. The free end 17 of the tube 18 may be deformed laterally outward or laterally away from the longitudinal axis 16 to form a generally flat laterally-extending flange or wall 19 having a generally smooth, flat, annular laterally-extending sealing surface 20 disposed in a plane substantially perpendicular to the longitudinal axis 16, as illustrated. Alternatively, for example, the flat laterally-extending sealing surface 20 of the first fitting member 11 may be formed on a separate piece that is attached to the tube 18 in the manner generally illustrated in the above-referenced U.S. Pat. No. 5,490,680, or in any other desired manner. The sleeve 13 is arranged on the tube 18 on the side of the flange or wall 19 opposite the sealing surface 20. The nut 14 may include an annular flange 21 that engages the sleeve 13 and may have an exterior wrench flat surface 22 for engagement with a wrench (not shown) for tightening the nut 14 onto the second fitting member 12.

The second flat face seal fitting member 12 may include a fitting member body 25 having a central passage 26, an exterior wrench flat surface 27 for engagement with a wrench (not shown) during assembly, and an exterior threaded end surface 28. A generally smooth, flat, annular, laterally-extending sealing surface 29 of the fitting member body 25 may be disposed in a plane generally perpendicular to the longitudinal axis 16. The sealing surface 29 may be generally parallel to the surface 20, and the surfaces 29 and 20 face in axially opposing directions toward one another.

An annular face groove or channel 30 may extend axially away from the sealing surface 29 into the body 25. The channel 30 includes generally cylindrical laterally inner and outer side walls 31 and 32 and a bottom wall 33. A retainer wall 34 extends laterally from the outer side wall 32 across a portion of the opening of the channel 30. The retainer wall 34 includes a top surface 35 facing longitudinally away from the bottom wall 33 and a bottom or retaining surface 36 facing longitudinally toward the bottom wall 33 to thereby form a lip. The top and bottom surfaces 35 and 36 meet at a laterally innermost annular edge 37 of the retainer wall 34. When the first fitting member 11, second fitting member 12, sleeve 13, and nut 14 are used as a conventional O-ring face seal fitting, the retainer wall 34 retains an elastomeric O-ring (not shown) in the channel 30 prior to and during assembly of the fitting 10 in the manner described in the above-referenced U.S. Pat. Nos. 5,490,680 and 5,564,177.

The conventional metal seal device 15 shown in FIGS. 1 and 2 includes a generally flat annular seal body 41 having opposite axially facing annular sealing surfaces 42 and 43, and a central passage 44 extending axially through the body 41 between the sealing surfaces 42 and 43. The seal 15 further includes longitudinally extending retainers 45. The body 41 and retainers 45 are of an integral one-piece construction. Each retainer 45 includes a fixed end 46 fixed to the annular seal body 41, a free end 47 spaced longitudinally away from the sealing surfaces 42 and 43, and an intermediate wall 48 extending between the fixed end 46 and free end 47. The intermediate wall 48 is generally C-shaped with a generally smooth convex outer surface 49 facing laterally outwardly away from the longitudinal axis 16 and a corresponding concave inner surface 50 facing laterally inwardly toward the longitudinal axis 16. In the assembled state, the convex outer wall 49 of each retainer 45 engages both the bottom or retaining surface 36 of the retainer wall 34 and the outer wall 32 of the channel 30. The retainers 45 position and hold the seal 15 in proper alignment with the second fitting member 12, so that the sealing surface 43 of the seal device 15 and the sealing surface 29 of the second fitting member 12 are aligned and engage one another before and during assembly of the second fitting member 12 and first fitting member 11.

Although the metal seal 15 provides suitable positioning and retention for many applications, one issue with the metal seal 15 is that the relatively thin metal material can lack stiffness which allows the seal 15 to distort (e.g., twist) in an unloaded state prior to assembly on the fluid fitting 10. This distortion can impact the retention functionality of the retainers 45 and can impact the ease of installation for the installer. This distortion issue becomes exacerbated with larger diameter fitting designs. The retainers 45 of the conventional metal seal 15 also may not provide adequate retaining force against the retainer wall of the fitting to prevent the seal 15 from being dislodged.

Turning to FIGS. 3-8, an exemplary face seal coupling assembly 100 according to an embodiment of the present disclosure is shown, including face seal fluid coupling 10 and metal seal 115, in which the metal seal 115 solves one or more problems associated with the conventional metal seal 15 shown in FIGS. 1 and 2. The fluid coupling 10 is generally the same as the fluid fitting 10 described above in connection with FIGS. 1 and 2, and thus the same reference numerals refer to the same or similar parts. It is understood that although the fluid coupling 10 according to the present disclosure is shown as a fluid fitting, other flat face fluid couplings for interconnecting fluid-carrying conduits could be employed, such as SAE J518/ISO 6162/ISO 6164 type flanges having a flat face design, for example.

As shown in the illustrated embodiment, the metal seal 115 includes an annular seal body 141 having opposite axially facing annular sealing surfaces 142 and 143, and a central passage 144 extending axially through the body 141 between the sealing surfaces 142 and 143. The seal 115 further includes one or more retainers 145 (also referred to as retaining members) configured to engage a surface in the annular face groove 30 of the coupling 10 with a retaining force for securing the seal 115 to the fluid coupling 10.

The retainers 145 may be circumferentially spaced apart along a radially inner portion 139 of the seal body 141, and may include two, three, four or more retainers 145. Each retainer 145 includes a fixed end 146 fixed to the radially inner portion 139 of the seal body 141, a free end 147 spaced from the seal body 141, and an intermediate portion 148 extending between the free end 147 and the fixed end 146. In the illustrated embodiment, the intermediate portion 148 (also referred to as an intermediate wall) extends axially toward the bottom surface 33 of the annular groove 30 and has a generally C-shaped cross-section. The C-shaped cross-section of the intermediate portion 148 is configured such that the concave side 150 of the C-shape faces radially inwardly and the convex side 149 of the C-shape faces radially outwardly. The C-shape of the intermediate portion 148 enables the retainer 145 to grab a radially protruding lip formed by the retainer wall 34 of the coupling 10. The C-shape of the intermediate portion 148 also may provide a smooth cam surface that enables displacement of the intermediate portion 148 and the free end 147 radially inwardly when the metal seal 115 is being installed on and removed from the annular groove 30 of the fluid coupling 10.

As shown, the annular seal body 141 also includes a radially outer annular angled portion 151 that is inclined at an angle ($\alpha$) relative to the first and second flat annular sealing faces 142, 143. The outer annular angled portion 151 is configured to enhance stiffness around the circumference of the seal body 141 to thereby reduce deformation (e.g., twisting) of the seal 115, which may be caused by residual stresses, external forces, or the like. Also as shown, the outer annular angled portion 151 of the seal 115 is configured to engage a radially outward face 23 of the fluid coupling 10, which by virtue of the incline of the angled portion 151, engages the face 23 with a force (F) that generates a moment (M) of force about a portion of the retainer 145. This moment (M) of force results in a reaction force (Fr) at the interface between the retainer 145 and side wall 32 and/or retainer wall 34. The additional reaction force (Fr) enhances the retaining force provided by the retainers 145, thereby promoting a more active engagement and securement of the seal 115 with the coupling 10.

As shown in the illustrated embodiment, the annular angled portion 151 continuously extends radially outwardly and axially toward the coupling 10 and terminates at a peripheral outer edge 154 of the seal 115. In exemplary embodiments, the radially outer peripheral portion proximal the outer edge 154 of the seal 115 is configured to engage the face 23 of the coupling 10 to thereby increase the lever-effect and the moment (M) of force acting about the fixed end 146 of the retainer 145, whereby the convex side 149 of the C-shaped intermediate portion 148 grips into the annular groove 30 at an underside of the lip of the retaining wall 34. In addition, the radially outer peripheral portion proximal the outer edge 154 engage the coupling face 23 helps to minimize the edge 154 from overhanging the face 23 of the coupling 10 and potentially getting caught, as may be the case in the convention seal 15 design. As such, the exemplary seal 115 enables positioning radially in between two fixed coupling ends in narrow conditions, which is often the case in a face seal coupling assembly which usually has zero tube entry for allowing a straight tube with two flanged ends to position and couple together. The conventional seal 15, on the other hand, has the overhanging outer edge that could be hit by the outer diameter corners of the flanges and pushed radially out of position. As such, the annular angled portion 151 of the seal 115 enables prevention of the collision with the flange outer diameter corners. Furthermore, because the metal seal body 141 may have resiliency (such as at transitional bend 152), the engagement force (F) provided by the outer annular angled portion 151 may provide a spring-like preload and lever-action across the seal face 142 that further enhances the moment (M) of force and retaining force (Fr) of the retainers 145.

The incline angle ($\alpha$) and annular width (W1) of the outer annular angled portion 151 may be configured as needed to provide the desired moment (M) and/or retaining force (Fr) when interacting with the coupling 10 in a particular application. This may depend on factors such as the material chosen for the seal body 141, the wall thickness (t) of the seal body 141, the diameter of the coupling 10, the annular width (W2) of the annular sealing surface(s) 142, 143, the lever-arm distance to the retainers 145, or the like. The engagement face 23 of the coupling 10 may be perpendicular to the central axis 16, or the engagement face 23 itself may have an inclined angle. The inclined angle (α) of the outer angled portion 151 may be about the same or greater than an inclined angle of the engagement face 23 of the coupling 10. In exemplary embodiments, the angle (α) may be in a range from about 5-degrees to about 45-degrees (including all values, ranges and subranges with 1-degree increments between the stated values), more particularly about 10-degrees to about 30-degrees, even more particularly about 25-degrees. In exemplary embodiments, the annular width (W1) of the annular angled portion 151 is less than the annular width (W2) of the annular seal face 142, such as a ratio (W1:W2) in a range from about 1:10 to about 1:5 (including all values, ranges and subranges with 1-point increments between the stated values), or about 1:2 to about 1:4, for example, such as about 1:3.

The metal seal 115 may be made from any suitable metal or combination of metals. For example, the metal of the seal 115 may be capable to withstand temperatures in a range from −400° F. to about 1200° F. An example of such metal may be stainless steel, such as 316 stainless. As shown, the seal body 141 (including seal faces 142, 143 and outer angled portion 151) and retainers 145 may be a unitary construction and may have a uniform wall thickness (t) for the respective parts 141, 145 of the seal 115. Such a metal seal 115 may be stamped from a metal blank with the outer angled portion 151 and retainers 145 then bent and formed into position. An exemplary wall thickness of the metal seal 115 may be in a range from about 0.010-inches to about 0.020-inches (including all values, ranges and subranges with 0.001-inch increments between the stated values). The metal seal 115 may be sized for standard-sized couplings, such as fittings, flanges, or the like, that are in a range from ¼-inch to 4-inch, for example.

In some exemplary embodiments, one or more of the retainers 145 are configured as resilient tabs or fingers that displace to fit over the retainer wall 34 and spring back to engage under the lip of the retainer wall 34. Alternatively or additionally, one or more of the retainers 145 may be configured to be plastically deformed by a tool or by hand to actively engage the retainer wall 34. The plastic deformation of the retainers 145 combined with the enhanced retaining force resulting from the lever-effect provided by outer annular angled portion 151 the moment (M) may provide a more active and secure engagement of the seal 115 with the coupling 10.

Turning to FIGS. 9-12, another exemplary face seal coupling assembly 200 according to an embodiment of the present disclosure is shown, including face seal fluid coupling 10 and metal seal 215. The fluid coupling 10 is the same as the fluid coupling described above, and consequently the same reference numerals are used. The metal seal 215 is substantially the same or similar to the above-referenced metal seal 115, and consequently the same reference numerals but in the 200-series are used to denote structures corresponding to similar structures in the metal seals 115, 215. In addition, the foregoing description of the metal seal 115 is equally applicable to the metal seal 215, except as noted below. Moreover, it is understood that aspects of the metal seals 115, 215 may be substituted for one another or used in conjunction with one another where applicable.

Figure 9:
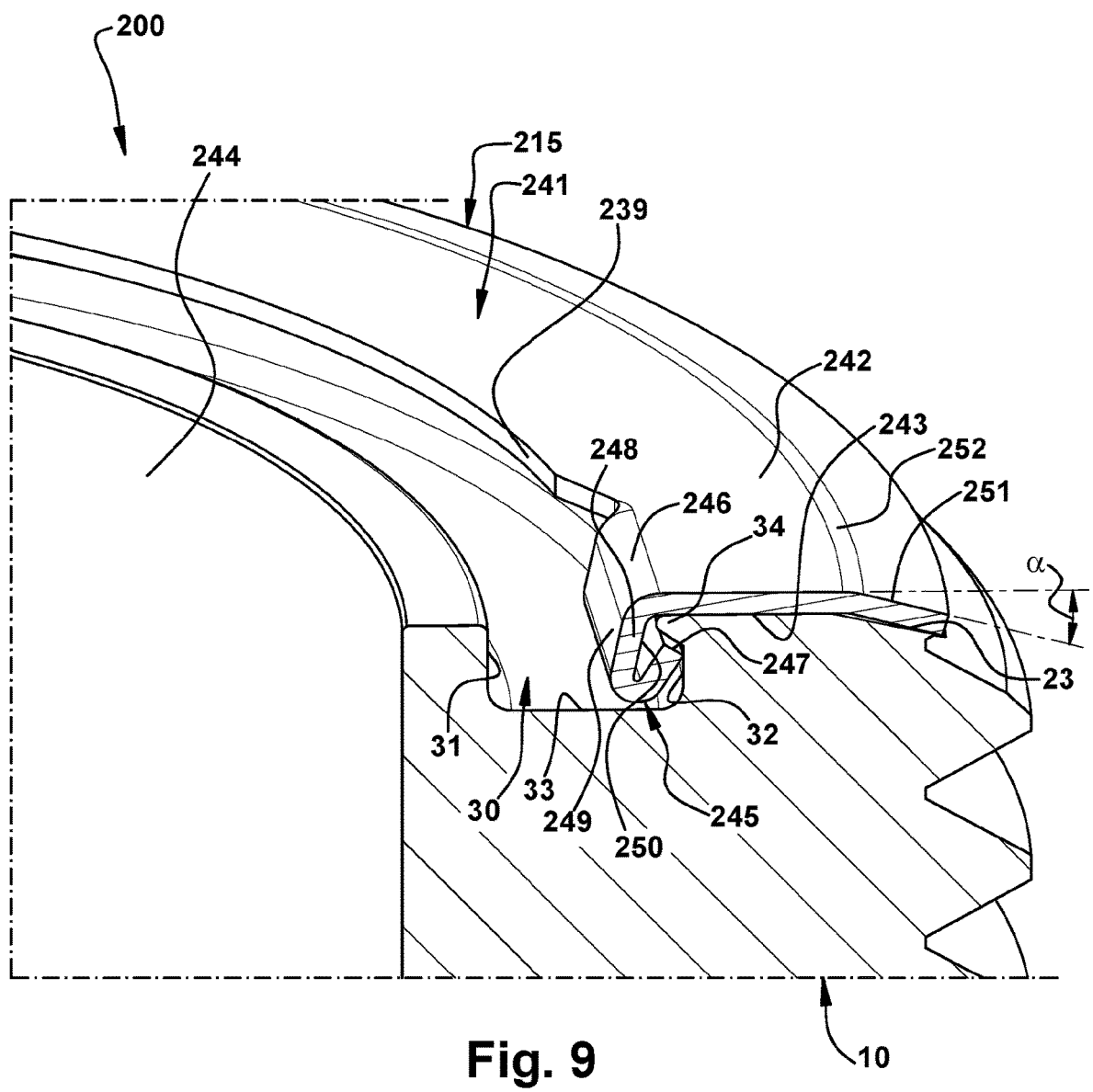
FIG. 9 is an enlarged cross-sectional perspective view of a portion of another exemplary metal seal according to another embodiment of the present disclosure installed on a fluid coupling.

Referring to FIG. 9, a partial cross-sectional perspective view of the metal seal 215 fully installed on the coupling 10 is shown. Similarly to the seal 115, the metal seal 215 includes an annular seal body 241 having opposite axially facing annular sealing surfaces 242 and 243, and a central passage 244 extends axially through the body 241 between the sealing surfaces 242 and 243. The seal 215 further includes one or more retainers 245 configured to engage a surface in the annular face groove 30 of the coupling 10, such as the retainer wall 34 and/or sidewall 32, for securing the seal 215 to the fluid coupling 10. The seal body 241 also includes a radially outer annular angled portion 251 that is inclined at an angle relative to the first and second flat annular sealing faces 242, 243. As described above, the outer annular angled portion 251 may be configured to enhance stiffness around the circumference of the seal body 241 and/or may enhance the retaining force of the retainer(s) 245 by generating a moment of force about the retainer(s) 245. The incline angle (a) of the angled portion 251, the annular width or ratio of the angled portion 251, the wall thickness of the seal 215, type of material, etc. may be the same as that described above in connection with seal 115.

The retainers 245 may be circumferentially spaced apart along a radially inner portion 239 of the seal body 241, and may include two, three, four or more retainers 245. Each retainer 245 includes a fixed end 246 fixed to the radially inner portion of the seal body 241, a free end 247 spaced from the seal body 241, and an intermediate portion 248 extending between the free end 247 and the fixed end 246. In the illustrated embodiment, the intermediate portion 248 (also referred to as intermediate wall) extends axially toward the bottom surface 33 of the annular groove 30 and forms a hook having a general angular C-shaped cross-section, which includes a V-shaped hook portion. The angular C-shaped intermediate portion 248 in this embodiment has the convex side 249 facing radially inwardly and the concave side 250 facing radially outwardly, and thus forms the hook whereby the free end 247 can engage the underside of the radially inwardly protruding lip of the retainer wall 34 to secure the seal 215 in place. In the illustrated embodiment, the retainers 245 are configured to be plastically deformed by a tool or by hand to actively engage the retainer wall 34.

Figure 10:
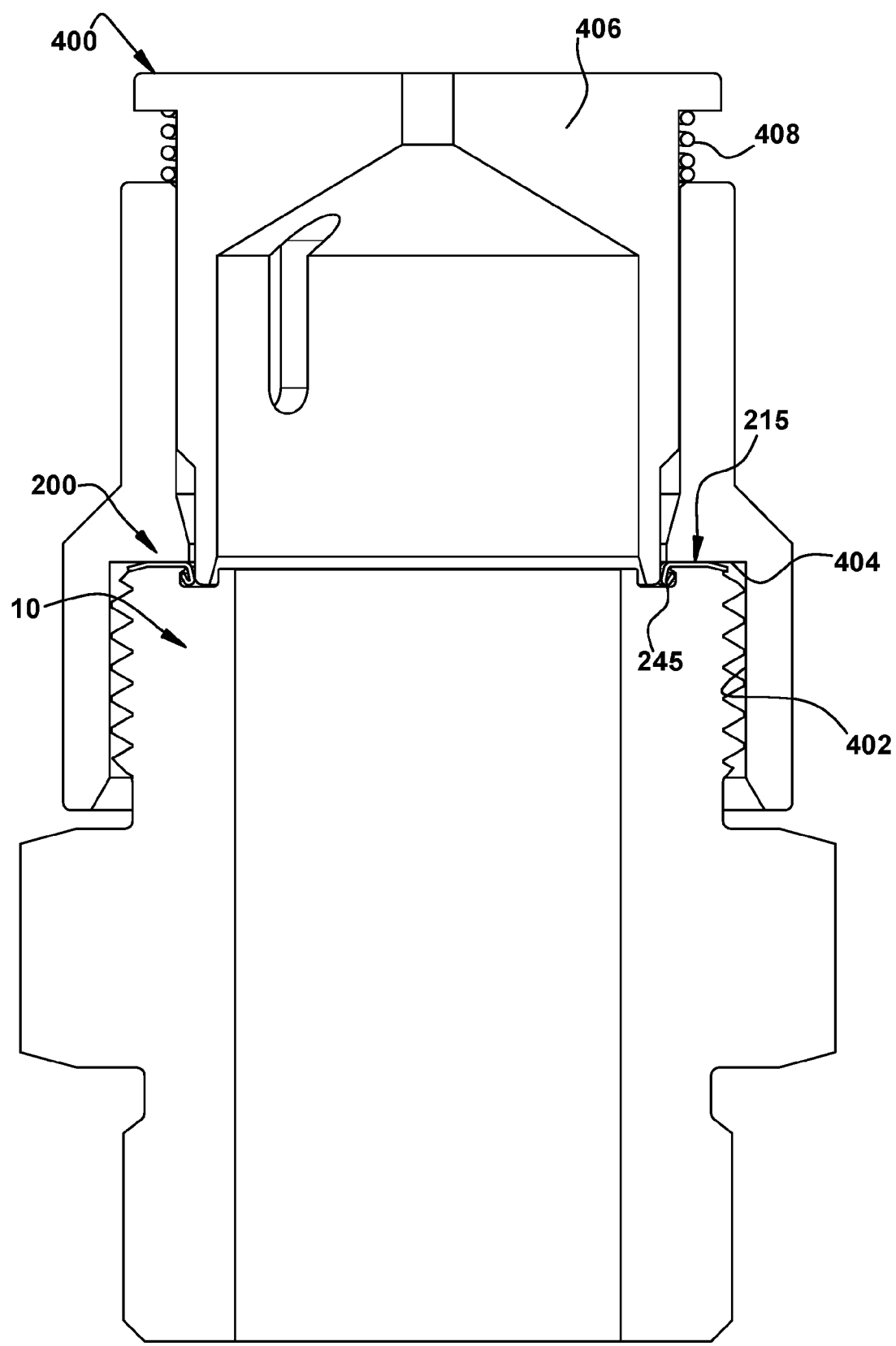
FIG. 10 is a cross-sectional side view of the metal seal and coupling in FIG. 9 showing installation with an exemplary tool.
Figure 11:
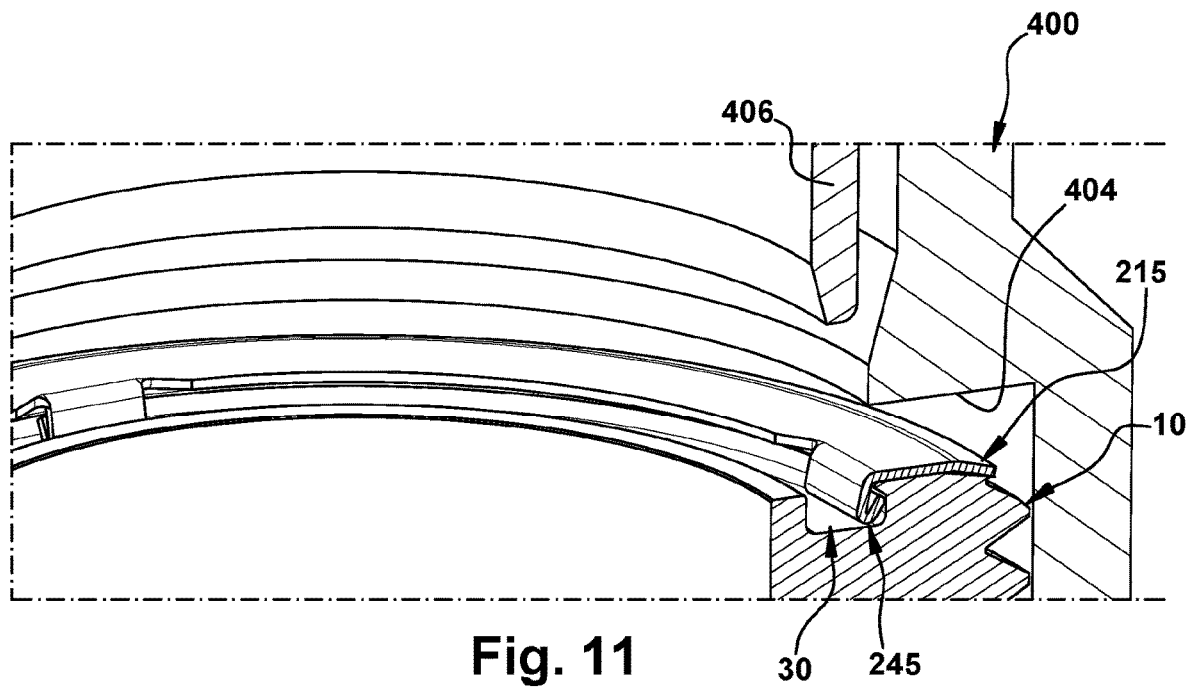
FIG. 11 is an enlarged cross-sectional perspective view showing installation according to FIG. 9 in an uninstalled state.
Figure 12:
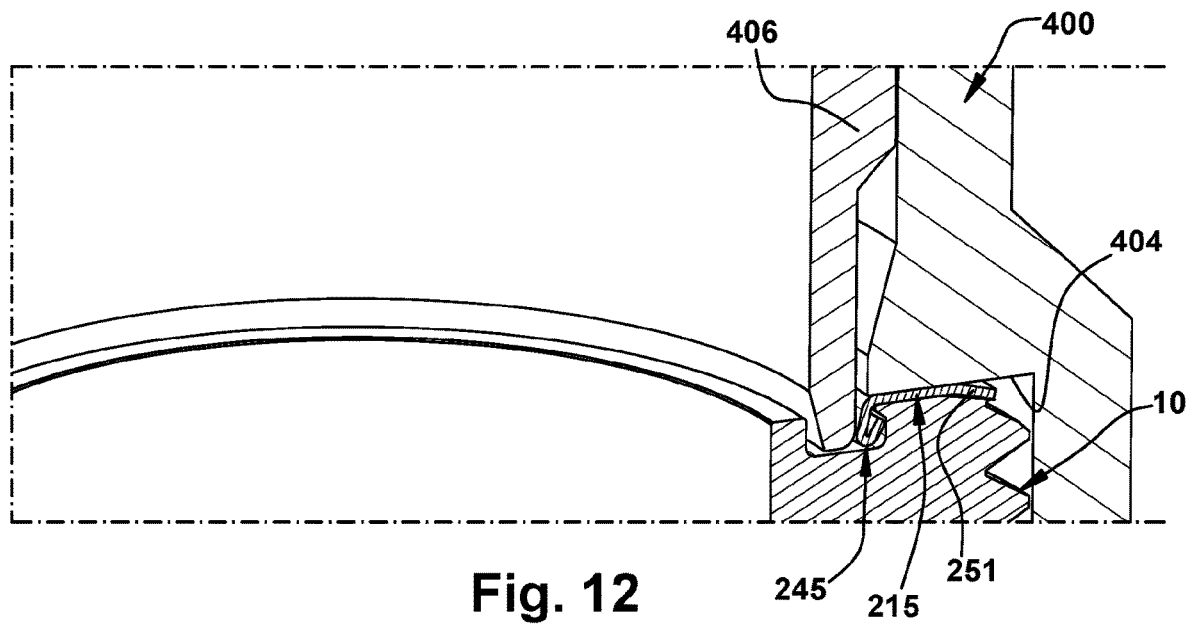
FIG. 12 is an enlarged cross-sectional perspective view showing installation according to FIG. 9 in an installed state.

Referring to FIGS. 10-12, an installation of the metal seal 215 onto the coupling 10 with an exemplary tool 400 is shown. As shown, the tool 400 includes a receptacle 402 that receives an end portion of the coupling 10. The receptable 402 includes an annular shoulder 404 that engages the end face of the coupling 10. A plunger 406 is adapted to fit within the annular groove 30 of the coupling 10 and displace and plastically deform the retainers 245 to latch onto the lip of the retainer wall 34. The plunger 406 may be spring-biased with a spring 408. FIG. 11 shows the seal 215 in an initial state in which the retainers 245 are not bent, and FIG. 12 shows an installed state by the tool 400 in which the retainers 245 (e.g., hook tabs) are plastically deformed into the installed state to grab onto the lip of the retainer wall 34.

Figure 13:
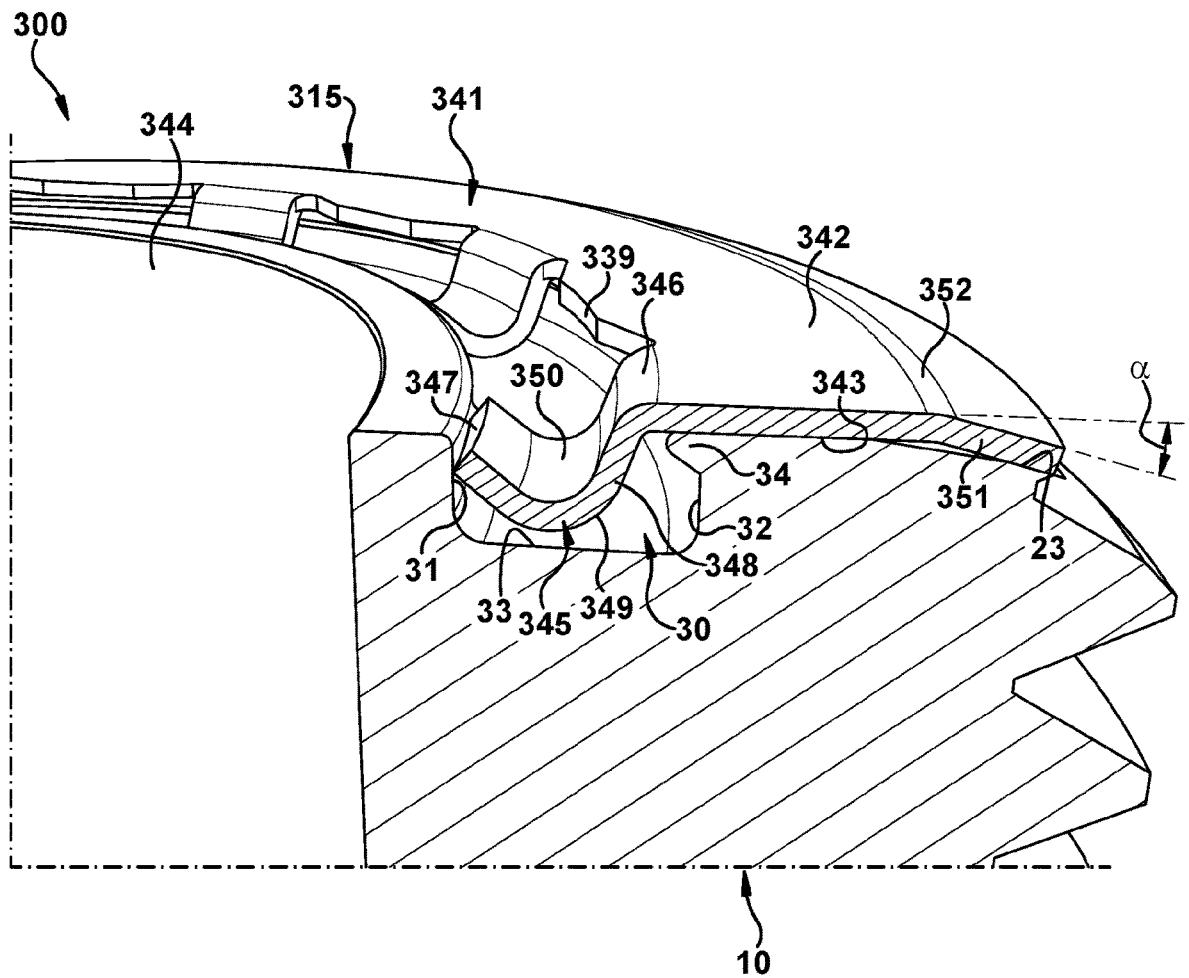
FIG. 13 is an enlarged cross-sectional perspective view of a portion of another exemplary metal seal according to another embodiment of the present disclosure installed on a fluid coupling.
Figure 14:
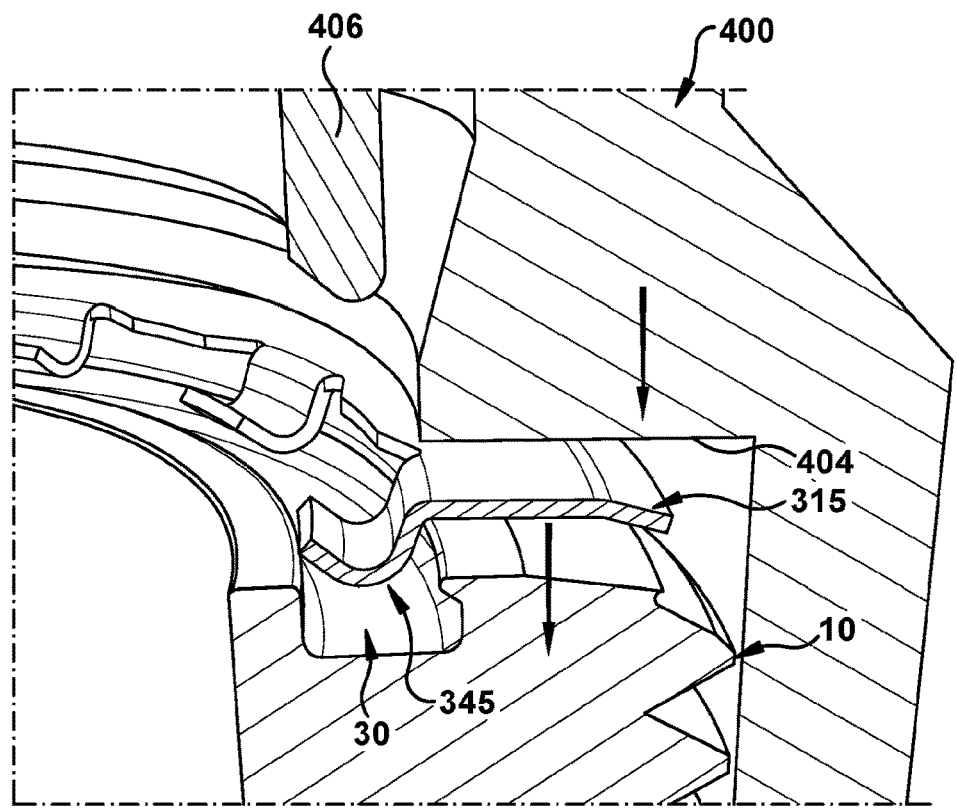
FIG. 14 is an enlarged cross-sectional perspective view showing installation of the metal seal in FIG. 13 in an uninstalled state.
Figure 15:
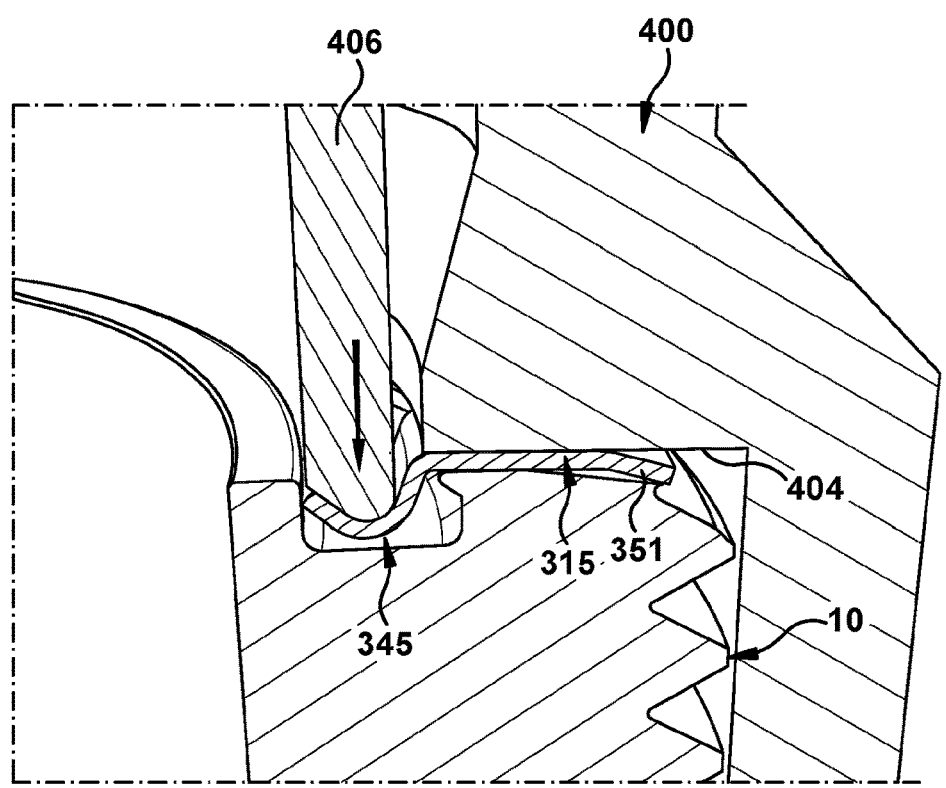
FIG. 15 is an enlarged cross-sectional perspective view showing installation of the metal seal in FIG. 13 in an installed state.

Turning to FIGS. 13-15, another exemplary face seal coupling assembly 300 according to an embodiment of the present disclosure is shown, including face seal fluid coupling 10 and metal seal 315. The fluid coupling 10 is the same as the fluid coupling described above, and consequently the same reference numerals are used. The metal seal 315 is substantially the same or similar to the above-referenced metal seals 115, 215 and consequently the same reference numerals but in the 300-series are used to denote structures corresponding to similar structures in the metal seals 115, 215, 315. In addition, the foregoing description of the metal seals 115, 215 is equally applicable to the metal seal 315, except as noted below. Moreover, it is understood that aspects of the metal seals 115, 215, 315 may be substituted for one another or used in conjunction with one another where applicable.

Referring to FIG. 13, a partial cross-sectional perspective view of the metal seal 315 fully installed on the coupling 10 is shown. Similarly to the seals 115 and 215, the metal seal 315 includes an annular seal body 341 having opposite axially facing annular sealing surfaces 342 and 343, and a central passage 344 extends axially through the body 341 between the sealing surfaces 342 and 343. The seal 315 further includes one or more retainers 345 configured to engage a surface of the annular face groove 30 of the fluid coupling 10 with a retaining force for securing the seal 315 to the fluid coupling 10. In the illustrated embodiment, the retainers 345 are configured to engage a radially inner sidewall 31 of the annular groove 30, which serves as a retainer wall of the coupling 10 in this embodiment. The seal body 341 also includes a radially outer annular angled portion 351 that is inclined at an angle (α) relative to the first and second flat annular sealing faces 342, 343. As described above, the outer annular angled portion 351 may be configured to enhance stiffness around the circumference of the seal body 341 and/or may enhance the retaining force of the retainer(s) 345 by generating a moment of force about the retainer(s) 345. The incline angle (α) of the angled portion 351, the annular width or ratio of the angled portion 351, wall thickness of the seal, type of material, etc. may be the same as that described above in connection with seal 115 and/or 215.

The retainers 345 may be circumferentially spaced apart along a radially inner portion of the seal body 341, and may include two, three, four or more retainers 345. Each retainer 345 includes a fixed end 346 fixed to the radially inner portion of the seal body 341, a free end 347 spaced from the seal body 341, and an intermediate portion 348 extending between the free end 347 and the fixed end 346. In the illustrated embodiment, the intermediate portion 348 (also referred to as intermediate wall) extends laterally across the groove 30 toward the radially inner sidewall 31 and forms a general C-shaped cross-section. The C-shaped intermediate portion 248 in this embodiment has the convex side 349 facing axially toward the bottom 33 of the groove 30 and the concave side 350 facing upwardly out of the groove 30. In the illustrated embodiment, the retainer 345 is adapted to form an interference fit in the groove 30 so that the free end 347 engages the inner wall 31 with a retaining force. The retainers 345 may be configured to be resilient to provide a spring force as a component of the retaining force; or the retainers 345 may be plastically deformed to form the interference fit.

Referring to FIGS. 14 and 15, an installation of the metal seal 315 onto the coupling 10 with an exemplary tool 400 is shown. The tool 400 may be the same as the tool described above, and consequently the same reference numerals are used. FIG. 14 shows the seal 315 in an initial state in which the retainers 345 have a wider extent than the groove 30 and thus overlap the radially inner wall 31. FIG. 15 shows an installed state by the tool 400 in which the retainers 345 are pushed into the groove 30 and the free ends 347 engage the radially inner wall 31.

Figure 16:
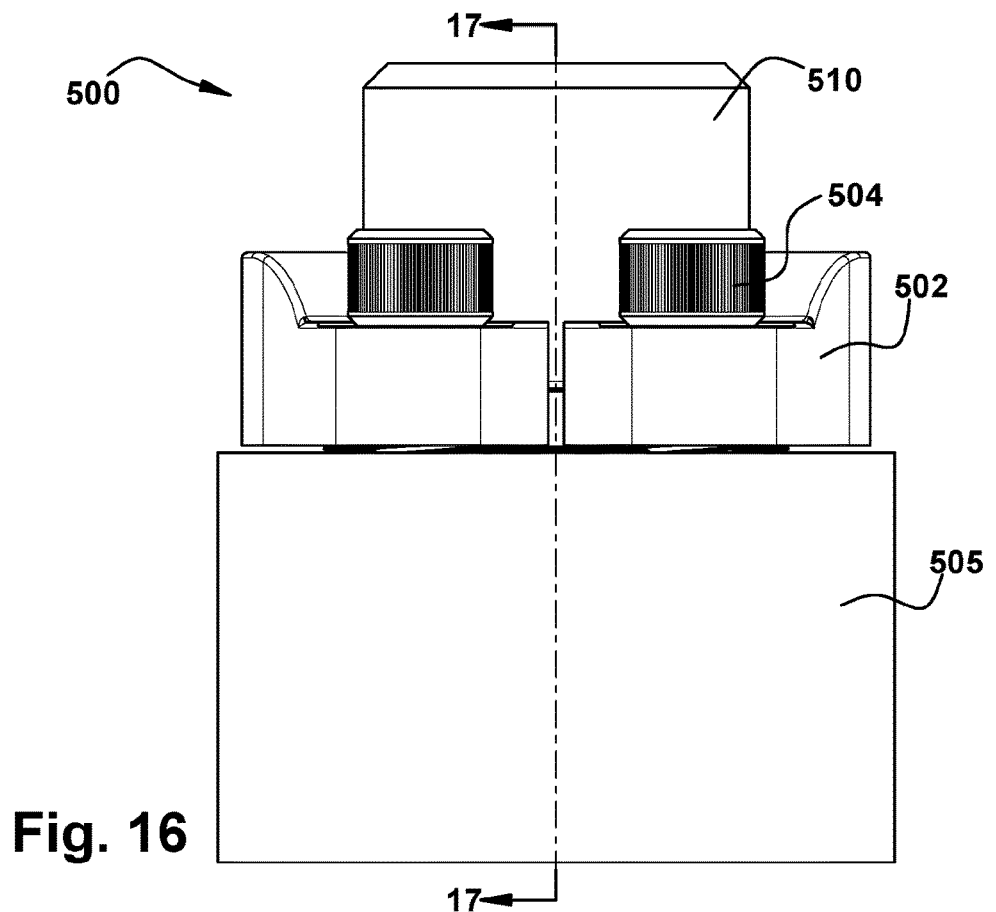
FIG. 16 is a side view of another exemplary flat face coupling assembly according to an embodiment.
Figure 17:
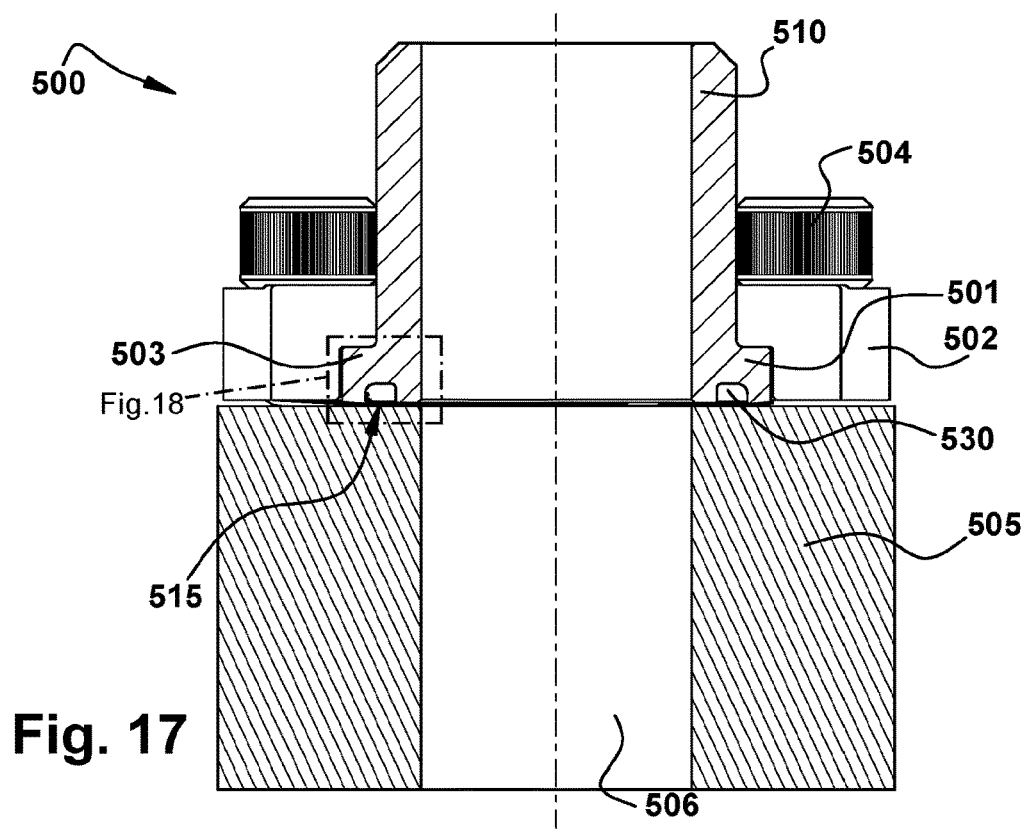
FIG. 17 is a cross-sectional side view about the line 17-17 in FIG. 16.
Figure 18:
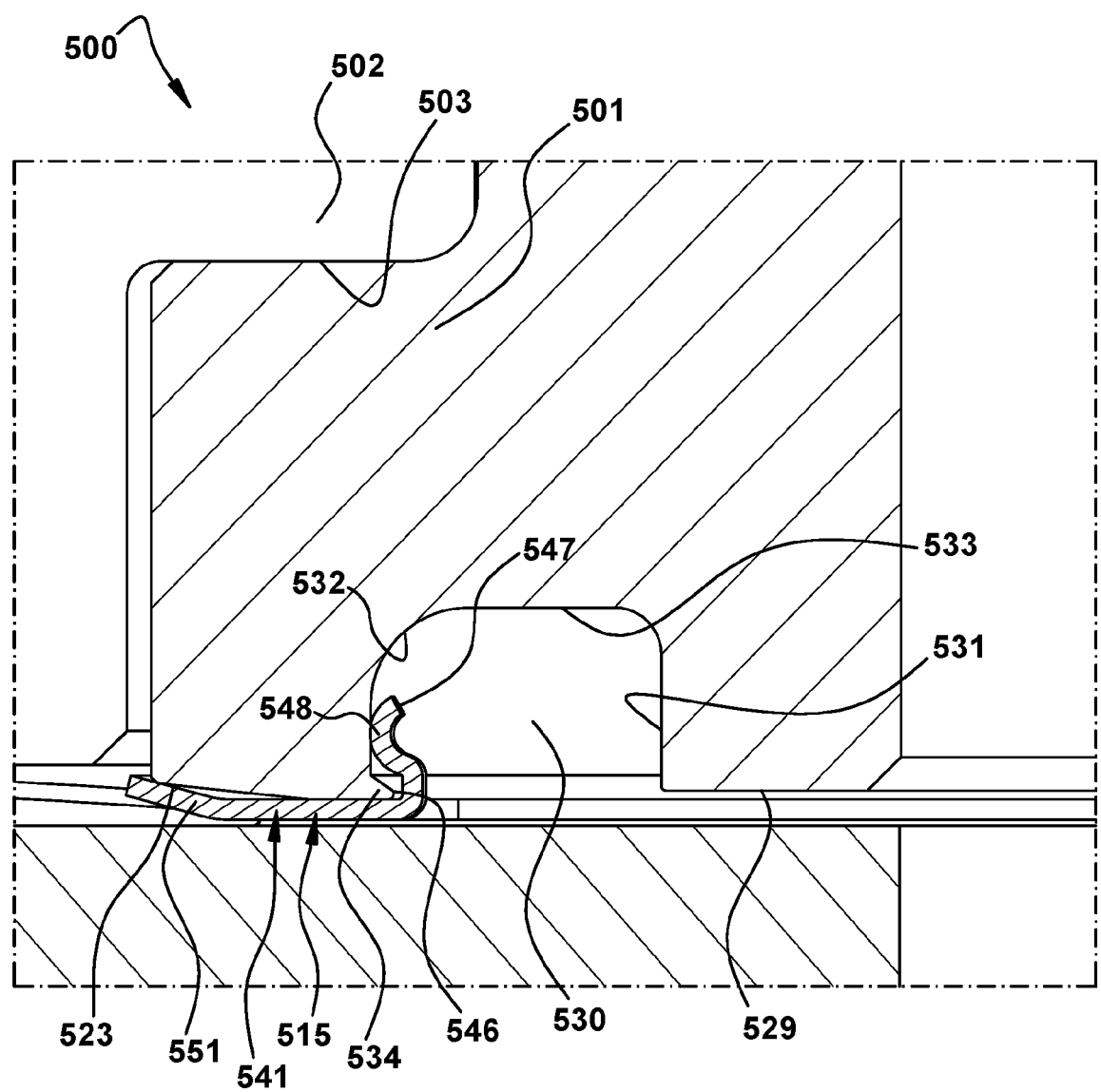
FIG. 18 is an enlarged cross-sectional side view taken from the section shown in FIG. 17.

Turning to FIGS. 16-17, another exemplary face seal coupling assembly 500 according to an embodiment of the present disclosure is shown. The coupling assembly 500 shares similarities with the foregoing face seal coupling assemblies 100, 200, 300 and consequently the same reference numerals but in the 500-series are used to denote structures corresponding to similar structures in the face seal coupling assemblies. In addition, the foregoing description of the face seal coupling assemblies 100, 200, 300 is equally applicable to the face seal coupling assembly 500, except as noted below. Moreover, it is understood that aspects of the face seal coupling assemblies 100, 200, 300, 400 may be substituted for one another or used in conjunction with one another where applicable.

In the illustrated embodiment, the face seal coupling assembly 500 is configured as a flange-style face seal coupling assembling, including a tube 510 (or tube end 510) having a radially outwardly protruding shoulder 501, a flat annular sealing surface 529, and an annular face groove or channel 530 extending into the surface 529. The annular groove 530 in the sealing surface 529 may be constructed the same as the above-described annular groove 30, including cylindrical laterally inner and outer side walls 531, 532; bottom wall 533; and retainer wall 534. A flange adapter 502 operatively couples to the tube end 510 via an interface 503, which is shown via radially overlapping shoulders of the tube end 510 and flange adapter 502 in the illustrated embodiment, but which also may include a tapered interface, or the like. In addition, the flange adapter 502 includes one or more fastening receivers (such as through-holes or threaded bores) that receive one or more fasteners 504 (e.g., bolts) for attaching the flange adapter 502 to the tube end 510. In the illustrated embodiment, the flange adapter 502 is attached to a manifold block 505 via the fasteners 504 to form a continuous fluid passage 506; although it is understood that the tube end 510 may be operatively coupled to another tube end via another flange adapter or the like.

As shown, a metal seal 515 is disposed on the sealing surface 529 between the tube end 510 and a sealing surface of the manifold block 505. In the illustrated embodiment, the metal seal 515 is substantially the same as the metal seal 115 described above, and includes an annular seal body 541, one or more retainers 545 having a fixed end 546 fixed to a radially inner portion of the seal body 541, a free end 547 spaced from the seal body 541, and an intermediate portion 548 extending between the free end and the fixed end. Similarly to the seal 115, the seal 515 has the at least one seal retainer 545 engaging the retainer wall 534 with a retaining force for securing the seal 515 to the fluid coupling. Also as with the seal 115, the seal 515 includes a radially outer annular angled portion 551 that is inclined at an angle relative to first and second flat annular sealing faces, wherein the outer annular angled portion 551 is configured to enhance stiffness around the circumference of the seal body and is configured to engage a radially outward face 523 of the tube end 510 to generate a moment of force that enhances the retaining force.

Exemplary face seal coupling assemblies including exemplary metal face seals have been described herein. According to an aspect, a metal seal for a flat face fluid coupling includes: an annular seal body defining a central axis and a central passage extending axially through the seal body along the central axis; and at least one seal retainer, the at least one seal retainer having a fixed end fixed to a radially inner portion of the seal body, a free end spaced from the seal body, and an intermediate portion extending between the free end and the fixed end, the at least one seal retainer being configured to engage a retainer wall of the fluid coupling with a retaining force for securing the seal to the fluid coupling; wherein the annular seal body has opposite axially facing first and second flat annular sealing surfaces, and a radially outer annular angled portion that is inclined relative to the first flat annular sealing surface, the annular angled portion being configured to enhance stiffness around a circumference of the annular seal body, and the annular angled portion being configured to engage a face of the fluid coupling to generate a moment of force about a portion of the at least one seal retainer for enhancing the retaining force of the at least one seal retainer acting against the retainer wall of the fluid coupling.

Embodiments may include one or more of the following additional features, separately or in any combination.

In exemplary embodiment(s), the annular angled portion includes a radially outer peripheral edge portion of the seal body, in which the radially outer peripheral edge portion is configured to engage the face of the fluid coupling and generate the moment about the fixed end of the at least one retainer.

In exemplary embodiment(s), the first and second sealing surfaces each extend in a lateral direction to lie in respective lateral planes that are perpendicular to the central axis, and the annular angled portion continuously extends radially outwardly and axially toward the fluid coupling such that the annular angled portion forms a peripheral edge of the seal body.

In exemplary embodiment(s), an incline angle of the annular angled portion relative to the first sealing face is in a range from 10-degrees to 30-degrees.

In exemplary embodiment(s), a ratio of an annular width of the first sealing face to an annular width of the annular angled portion is in a range from 1:2 to 1:4; more particularly wherein the annular width of the first sealing face combined with the annular width of the annular angled portion constitutes an entirety of the annular width of the seal body.

In exemplary embodiment(s), the seal body is unitary with the at least one retainer, and the at least one retainer and the seal body, including the annular angled portion, have a constant cross-sectional wall thickness relative to each other.

In exemplary embodiment(s), the at least one retainer is formed as a tab that is configured to engage the retainer wall of the fluid coupling within an annular face groove of the fluid coupling.

In exemplary embodiment(s), the at least one retainer includes a plurality of retainers circumferentially spaced apart along a radially inner portion of the seal body.

In exemplary embodiment(s), the at least one retainer is resilient and includes a biasing force when installed onto the fluid coupling that contributes at least partially to the retaining force acting against the retainer wall of the fluid coupling.

In exemplary embodiment(s), the at least one retainer is plastically deformable when installed on the fluid coupling to at least partially contribute to the retaining force acting against the retainer wall of the fluid coupling.

In exemplary embodiment(s), the intermediate portion of the at least one retainer has a C-shaped cross-section including a concave side and a convex side, wherein the concave side faces radially inwardly, and the convex side faces radially outwardly, the convex side being configured to engage a radially inwardly protruding lip of the retainer wall of the fluid coupling.

In exemplary embodiment(s), the intermediate portion of the at least one retainer forms a hook including a concave side and a convex side, wherein the convex side faces radially inwardly, and the concave side faces radially outwardly, the hook being configured such that the free end is engageable with a radially inwardly protruding lip of the retainer wall of the fluid coupling.

In exemplary embodiment(s), the intermediate portion of the at least one retainer has a C-shaped cross-section including a concave side and a convex side, the intermediate portion being configured to extend laterally across an annular face groove in the fluid coupling such that the convex side faces axially toward a bottom of the annular face groove and the concave side faces axially away from the bottom of the annular face groove, and wherein the at least one retainer is configured such that the free end is engageable with a radially inner wall of the annular face groove to thereby hold the seal in place relative to the fluid coupling.

In exemplary embodiment(s), a combination or assembly including the seal according to any of the foregoing with a flat face seal fluid coupling is provided, in which the flat face seal fluid coupling having: a first end with a flat sealing surface engaging one of the first or second flat annular sealing surfaces of the metal seal, an annular face groove extending axially into the first end of the coupling member and axially away from the sealing surface of the coupling member, and a retainer wall extending circumferentially around the annular face groove.

In exemplary embodiment(s), the retainer wall extends circumferentially around the annular face groove adjacent to the coupling member sealing surface, the retainer wall having an inner surface facing axially away from the seal body and an outer surface abutting the seal body.

In exemplary embodiment(s), the intermediate portion of the at least one retainer of the seal engages the inner surface of the retainer wall.

In exemplary embodiment(s), the free end of the at least one retainer of the seal engages the inner surface of the retainer wall.

In exemplary embodiment(s), the retainer wall forms a radially inner surface of the annular face groove, and the intermediate portion of the at least one retainer is configured to extend laterally across the annular face groove such that the intermediate portion or the free end of the at least one retainer engages the retainer wall.

According to another aspect, a fluid coupling assembly includes: a first face seal fluid coupling having a first flat sealing surface at a first end, a first fluid passage extending through the first end radially inwardly of the first flat sealing surface, and a threaded nut rotatable about the first end; a second face seal fluid coupling having: threads for threadedly engaging the threaded nut of the first fluid coupling; a second flat sealing surface at a second end of the second fluid coupling that faces toward the first flat sealing surface of the first fluid coupling, an annular face groove extending axially into the second end and axially away from the second flat sealing surface of the second fluid coupling, and a second fluid passage extending through the second end radially inwardly of the second flat sealing surface and the annular face groove; and a metal seal arranged between the first flat sealing surface and the second flat sealing surface, the metal seal comprising: an annular seal body defining a central axis and a central passage extending axially through the seal body along the central axis, the central passage being aligned with the first and second fluid passages of the fluid coupling; and retainers circumferentially spaced apart from each other about a radially inner portion of the annular seal body, each retainer having a fixed end fixed to the radially inner portion, a free end spaced from the seal body, and an intermediate portion extending between the free end and the fixed end, the retainers being configured to engage a surface of the annular face groove of the second fluid coupling; wherein the annular seal body has opposite axially facing first and second flat annular sealing surfaces in which the first annular sealing surface engages the first flat sealing surface of the first fluid coupling and the second annular sealing surface engages the second flat sealing surface of the second fluid coupling, and the annular seal body having an annular angled portion that is radially outward of the first and second flat annular sealing surfaces and is inclined relative to the first flat annular sealing surface in a direction radially outwardly and toward the second fluid coupling, the annular angled portion being configured to enhance stiffness around a circumference of the annular seal body, and being configured to engage a surface of the second fluid coupling to generate a moment of force that enhances retaining force of the retainers acting against the surface of the annular groove of the second fluid coupling.

According to another aspect, a metal seal for a flat face seal fluid coupling, includes: a generally flat annular seal body defining a central axis and a central passage extending axially through the seal body along the central axis and between axially oppositely facing first and second generally flat annular sealing surfaces, the annular seal body having an outer annular angled portion; a longitudinally extending retainer, the retainer having: a fixed end rigidly fixed to the seal body, a free end axially spaced from the seal body, and an intermediate wall extending between the free end and the fixed end, the intermediate wall extending axially away from the fixed end, wherein the intermediate wall has a generally C-shaped cross section, the concave side of the C-shaped wall faces radially inward, and the convex side of the C-shaped wall faces radially outward and provides a smooth cam surface to displace the intermediate wall and the free end radially inwardly when the metal seal is being installed on and removed from a face seal coupling member, wherein the angled surface extends longitudinally toward the free end of the retainer.

According to another aspect, a metal seal for a flat face seal fluid coupling, includes: a generally flat annular seal body defining a central axis and a central passage extending axially through the seal body along the central axis and between axially oppositely facing first and second generally flat annular sealing surfaces; a longitudinally extending retainer, the retainer having: a fixed end rigidly fixed to the seal body, a free end axially spaced from the seal body, and an intermediate wall extending between the free end and the fixed end, the intermediate wall extending axially away from the fixed end, wherein the intermediate wall has a generally C-shaped cross section, the concave side of the C-shaped wall faces axially away from the fixed end, and the convex side of the C-shaped wall faces axially toward the fixed end and provides a surface for a tool to displace the intermediate wall and the free end radially inwardly when the metal seal is being installed on a face seal coupling member, wherein the retainer has only a single curve between the free end and the fixed end so as to form an overall C-shape.

In exemplary embodiments, the metal seal further includes a conical portion on an inner diameter of the metal seal.

As used herein, an "operative connection," or a connection by which entities are "operatively connected," is one in which the entities are connected in such a way that the entities may perform as intended. An operative connection may be a direct connection or an indirect connection in which an intermediate entity or entities cooperate or otherwise are part of the connection or are in between the operatively connected entities. An operative connection or coupling may include the entities being integral and unitary with each other.

It is to be understood that terms such as "top," "bottom," "upper," "lower," "left," "right," "front," "rear," "forward," "rearward," and the like as used herein may refer to an arbitrary frame of reference, rather than to the ordinary gravitational frame of reference.

It is to be understood that all ranges and ratio limits disclosed in the specification and claims may be combined in any manner. It is to be understood that unless specifically stated otherwise, references to "a," "an," and/or "the" may include one or more than one, and that reference to an item in the singular may also include the item in the plural.

The term "about" as used herein refers to any value which lies within the range defined by a variation of up to ±10% of the stated value, for example, ±10%, ±9%, ±8%, ±7%, ±6%, ±5%, ±4%, ±3%, ±2%, ±1%, ±0.01%, or ±0.0% of the stated value, as well as values intervening such stated values.

The phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The word "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," may refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

The transitional words or phrases, such as "comprising," "including," "carrying," "having," "containing," "involving," "holding," and the like, are to be understood to be open-ended, i.e., to mean including but not limited to.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A metal seal for a flat face fluid coupling, comprising:
an annular seal body defining a central axis and a central passage extending axially through the seal body along the central axis; and
at least one seal retainer, the at least one seal retainer having a fixed end fixed to a radially inner portion of the seal body, a free end spaced from the seal body, and an intermediate portion extending between the free end and the fixed end, the at least one seal retainer being configured to engage a retainer wall of the fluid coupling with a retaining force for securing the seal to the fluid coupling;
wherein the annular seal body has opposite axially facing first and second flat annular sealing surfaces, and a radially outer annular angled portion that is inclined relative to the first flat annular sealing surface, the annular angled portion being configured to enhance stiffness around a circumference of the annular seal body, and the annular angled portion being configured to engage a face of the fluid coupling to generate a moment of force about a portion of the at least one seal retainer for enhancing the retaining force of the at least one seal retainer acting against the retainer wall of the fluid coupling.

2. The seal according to claim 1, wherein the annular angled portion includes a radially outer peripheral edge portion of the seal body, in which the radially outer peripheral edge portion is configured to engage the face of the fluid coupling and generate the moment about the fixed end of the at least one retainer.

3. The seal according to claim 1, wherein the first and second sealing surfaces each extend in a lateral direction to lie in respective lateral planes that are perpendicular to the central axis, and the annular angled portion continuously extends radially outwardly and axially toward the fluid coupling such that the annular angled portion forms a peripheral edge of the seal body.

4. The seal according to claim 1, wherein an incline angle of the annular angled portion relative to the first sealing face is in a range from 10-degrees to 30-degrees.

5. The seal according to claim 1, wherein a ratio of an annular width of the first sealing face to an annular width of the annular angled portion is in a range from 1:2 to 1:4; more particularly wherein the annular width of the first sealing face combined with the annular width of the annular angled portion constitutes an entirety of the annular width of the seal body.

6. The seal according to claim 1, wherein the seal body is unitary with the at least one retainer, and the at least one retainer and the seal body, including the annular angled portion, have a constant cross-sectional wall thickness relative to each other.

7. The seal according to claim 1, wherein the at least one retainer is formed as a tab that is configured to engage the retainer wall of the fluid coupling within an annular face groove of the fluid coupling.

8. The seal according to claim 1, wherein the at least one retainer includes a plurality of retainers circumferentially spaced apart along a radially inner portion of the seal body.

9. The seal according to claim 1, wherein the at least one retainer is resilient and includes a biasing force when installed onto the fluid coupling that contributes at least partially to the retaining force acting against the retainer wall of the fluid coupling.

10. The seal according to claim 1, wherein the at least one retainer is plastically deformable when installed on the fluid coupling to at least partially contribute to the retaining force acting against the retainer wall of the fluid coupling.

11. The seal according to claim 1, wherein the intermediate portion of the at least one retainer has a C-shaped cross-section including a concave side and a convex side, wherein the concave side faces radially inwardly, and the convex side faces radially outwardly, the convex side being configured to engage a radially inwardly protruding lip of the retainer wall of the fluid coupling.

12. The seal according to claim 1, wherein the intermediate portion of the at least one retainer forms a hook including a concave side and a convex side, wherein the convex side faces radially inwardly, and the concave side faces radially outwardly, the hook being configured such that the free end is engageable with a radially inwardly protruding lip of the retainer wall of the fluid coupling.

13. The seal according to claim 1, wherein the intermediate portion of the at least one retainer has a C-shaped cross-section including a concave side and a convex side, the intermediate portion being configured to extend laterally across an annular face groove in the fluid coupling such that the convex side faces axially toward a bottom of the annular face groove and the concave side faces axially away from the bottom of the annular face groove, and wherein the at least one retainer is configured such that the free end is engageable with a radially inner wall of the annular face groove to thereby hold the seal in place relative to the fluid coupling.

14. A combination including the seal according to claim 1 in combination with a flat face seal fluid coupling, the flat face seal fluid coupling having:
a first end with a flat sealing surface engaging one of the first or second flat annular sealing surfaces of the metal seal,
an annular face groove extending axially into the first end of the coupling member and axially away from the sealing surface of the coupling member, and
a retainer wall extending circumferentially around the annular face groove.

15. The combination according to claim 14, wherein the retainer wall extends circumferentially around the annular face groove adjacent to the coupling member sealing surface, the retainer wall having an inner surface facing axially away from the seal body and an outer surface abutting the seal body.

16. The combination according to claim 15, wherein the intermediate portion of the at least one retainer of the seal engages the inner surface of the retainer wall.

17. The combination according to claim 15, wherein the free end of the at least one retainer of the seal engages the inner surface of the retainer wall.

18. The combination according to claim 14, wherein the retainer wall forms a radially inner surface of the annular face groove, and the intermediate portion of the at least one retainer is configured to extend laterally across the annular face groove such that the intermediate portion or the free end of the at least one retainer engages the retainer wall.

19. A fluid coupling assembly, comprising:
a first face seal fluid coupling having a first flat sealing surface at a first end, a first fluid passage extending through the first end radially inwardly of the first flat sealing surface, and a threaded nut rotatable about the first end;
a second face seal fluid coupling having:
threads for threadedly engaging the threaded nut of the first fluid coupling;

a second flat sealing surface at a second end of the second fluid coupling that faces toward the first flat sealing surface of the first fluid coupling, an annular face groove extending axially into the second end and axially away from the second flat sealing surface of the second fluid coupling, and a second fluid passage extending through the second end radially inwardly of the second flat sealing surface and the annular face groove; and a metal seal arranged between the first flat sealing surface and the second flat sealing surface, the metal seal comprising:

an annular seal body defining a central axis and a central passage extending axially through the seal body along the central axis, the central passage being aligned with the first and second fluid passages of the fluid coupling; and retainers circumferentially spaced apart from each other about a radially inner portion of the annular seal body, each retainer having a fixed end fixed to the radially inner portion, a free end spaced from the seal body, and an intermediate portion extending between the free end and the fixed end, the retainers being configured to engage a surface of the annular face groove of the second fluid coupling;

wherein the annular seal body has opposite axially facing first and second flat annular sealing surfaces in which the first annular sealing surface engages the first flat sealing surface of the first fluid coupling and the second annular sealing surface engages the second flat sealing surface of the second fluid coupling, and the annular seal body having an annular angled portion that is radially outward of the first and second flat annular sealing surfaces and is inclined relative to the first flat annular sealing surface in a direction radially outwardly and toward the second fluid coupling, the annular angled portion being configured to enhance stiffness around a circumference of the annular seal body, and being configured to engage a surface of the second fluid coupling to generate a moment of force that enhances retaining force of the retainers acting against the surface of the annular groove of the second fluid coupling.

* * * * *